(12) United States Patent
Zhou

(10) Patent No.: US 11,935,564 B2
(45) Date of Patent: Mar. 19, 2024

(54) VIDEO EDITING METHOD AND INTELLIGENT MOBILE TERMINAL

(71) Applicant: GUANGZHOU BAIGUOYUAN INFORMATION TECHNOLOGY CO., LTD., Guangzhou (CN)

(72) Inventor: Yutao Zhou, Guangzhou (CN)

(73) Assignee: BIGO TECHNOLOGY PTE. LTD., Mapletree Business (SG)

( * ) Notice: Subject to any disclaimer, the term of this patent is extended or adjusted under 35 U.S.C. 154(b) by 111 days.

(21) Appl. No.: 16/767,729

(22) PCT Filed: Nov. 30, 2018

(86) PCT No.: PCT/CN2018/118426
§ 371 (c)(1),
(2) Date: May 28, 2020

(87) PCT Pub. No.: WO2019/105446
PCT Pub. Date: Jun. 6, 2019

(65) Prior Publication Data
US 2021/0375321 A1  Dec. 2, 2021

(30) Foreign Application Priority Data
Nov. 30, 2017  (CN) .......................... 201711240978.5

(51) Int. Cl.
*G11B 27/031* (2006.01)
*G06F 3/04847* (2022.01)
*G11B 27/34* (2006.01)

(52) U.S. Cl.
CPC ........ *G11B 27/031* (2013.01); *G06F 3/04847* (2013.01); *G11B 27/34* (2013.01)

(58) Field of Classification Search
CPC ..... G11B 27/031; G11B 27/34; G11B 27/022; G06F 3/04847; G06F 3/0484; G06V 20/49
(Continued)

(56) References Cited

U.S. PATENT DOCUMENTS

| | | |
|---|---|---|
| 2003/0002851 A1 | 1/2003 | Hsiao et al. |
| 2004/0001079 A1 | 1/2004 | Zhao et al. |

(Continued)

FOREIGN PATENT DOCUMENTS

| | | |
|---|---|---|
| CN | 101322112 A | 12/2008 |
| CN | 102572300 A | 7/2012 |

(Continued)

OTHER PUBLICATIONS

First office action of Chinese application No. 201711240978.5 dated Jul. 3, 2019.
(Continued)

*Primary Examiner* — Thai Q Tran
*Assistant Examiner* — Nienru Yang
(74) *Attorney, Agent, or Firm* — Dilworth & Barrese, LLP

(57) ABSTRACT

Disclosed is a video editing method including: acquiring an editing instruction to be executed from a user; calling a template video stored in advance according to the editing instruction, and acquiring a time axis representing duration of the template video; and overlaying the time axis on a progress bar of an editing video to indicate, by a combination of the time axis and the progress bar, a position of the template video in the editing video. A video editing apparatus and a smart mobile terminal are further provided.

14 Claims, 5 Drawing Sheets

(58) Field of Classification Search
USPC .......................................................... 386/282
See application file for complete search history.

(56) References Cited

U.S. PATENT DOCUMENTS

| | | | |
|---|---|---|---|
| 2004/0131278 A1* | 7/2004 | Imagawa | G06T 11/60 |
| | | | 382/284 |
| 2006/0224940 A1 | 10/2006 | Lee | |
| 2007/0189708 A1* | 8/2007 | Lerman | G11B 27/034 |
| | | | 386/280 |
| 2010/0241961 A1 | 9/2010 | Peterson et al. | |
| 2011/0276881 A1* | 11/2011 | Keng | G11B 27/034 |
| | | | 715/723 |
| 2013/0298021 A1* | 11/2013 | Park | G06F 3/04847 |
| | | | 715/716 |
| 2014/0072281 A1 | 3/2014 | Cho | |
| 2014/0096002 A1 | 4/2014 | Dey et al. | |
| 2014/0195916 A1* | 7/2014 | Kwon | H04N 5/772 |
| | | | 715/722 |
| 2014/0372919 A1 | 12/2014 | Fan et al. | |
| 2015/0318020 A1* | 11/2015 | Pribula | H04N 21/2743 |
| | | | 386/290 |
| 2016/0073155 A1 | 3/2016 | Subramaniam et al. | |
| 2016/0307604 A1* | 10/2016 | Hirajoh | H04N 21/858 |
| 2017/0068380 A1 | 3/2017 | Hong et al. | |

FOREIGN PATENT DOCUMENTS

| | | | |
|---|---|---|---|
| CN | 103220490 A | 7/2013 |
| CN | 103716712 A | 4/2014 |
| CN | 103745736 A | 4/2014 |
| CN | 103916535 A | 7/2014 |
| CN | 103931199 A | 7/2014 |
| CN | 105827997 A | 8/2016 |
| CN | 106911900 A | 6/2017 |
| CN | 107026986 A | 8/2017 |
| CN | 107256117 A | 10/2017 |
| CN | 108024073 A | 5/2018 |
| JP | 2017027563 A | 2/2017 |
| RU | 2419832 C2 | 5/2011 |
| RU | 2530301 C2 | 10/2014 |
| WO | 2014069964 A1 | 5/2014 |

OTHER PUBLICATIONS

Second office action of Chinese application No. 201711240978.5 dated Dec. 4, 2019.
Third office action of Chinese application No. 201711240978.5 dated Apr. 3, 2020.
Notification to grant patent right for invention of Chinese application No. 201711240978.5 dated Aug. 6, 2020.
Written opinion of Singapore application No. 11202005077Q dated Mar. 7, 2022.
Examination report of Indian application No. 202047027012 dated Aug. 13, 2021.
Decision of grant a patent of Russian application No. 2020120872 dated Oct. 15, 2021.

* cited by examiner

VIDEO EDITING METHOD AND INTELLIGENT MOBILE TERMINAL

CROSS-REFERENCE TO RELATED APPLICATION

This application is a National Stage of International Application No. PCT/CN2018/118426, filed on Nov. 30, 2018, which claims priority to Chinese Patent Applications No. 201711240978.5 filed with the China National Intellectual Property Administration on Nov. 30, 2017 and entitled "VIDEO EDITING METHOD AND DEVICE, AND INTELLIGENT MOBILE TERMINAL", the entire contents of which are incorporated herein by reference.

TECHNICAL FIELD

The embodiments of the present disclosure relate to the field of live broadcasting, and more particularly to a video editing method, and an intelligent mobile terminal.

BACKGROUND

Video editing refers to a process in which a desirable video is captured first with a video camera and then edited by a video editing software on the computer to be made into a disc. However, as the processing capability of intelligent mobile terminals is improved, instant editing of videos has become a demand of the development, and it is a new demand to enable the intelligent mobile terminal to edit the short videos as captured.

SUMMARY

The embodiments of the present disclosure provide a video editing method, and an intelligent mobile terminal, in which a plurality of videos are arranged on a same time track for editing the positions thereof.

In a first aspect, a video editing method is provided. The method includes the following steps:
  acquiring an editing instruction;
  calling a template video according to the editing instruction, and acquiring a time axis representing duration of the template video; and
  overlaying the time axis on a progress bar of an editing video to indicate, by a combination of the time axis and the progress bar, a position of the template video in the editing video.

In a second aspect, an intelligent mobile terminal is provided. The terminal includes:
  one or more processors;
  a memory; and
  one or more application programs, wherein the one or more application programs are stored in the memory and are configured to be executed by the one or more processors, and the one or more application programs are configured to:
  acquire an editing instruction;
  call a template video according to the editing instruction, and acquire a time axis representing duration of the template video; and
  overlay the time axis on a progress bar of an editing video to indicate, by a combination of the time axis and the progress bar, a position of the template video in the editing video.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings as described below show merely some embodiments of the present disclosure, and a person of ordinary skill in the art can also derive other drawings from these accompanying drawings without creative efforts.

DETAILED DESCRIPTION

Figure 1:
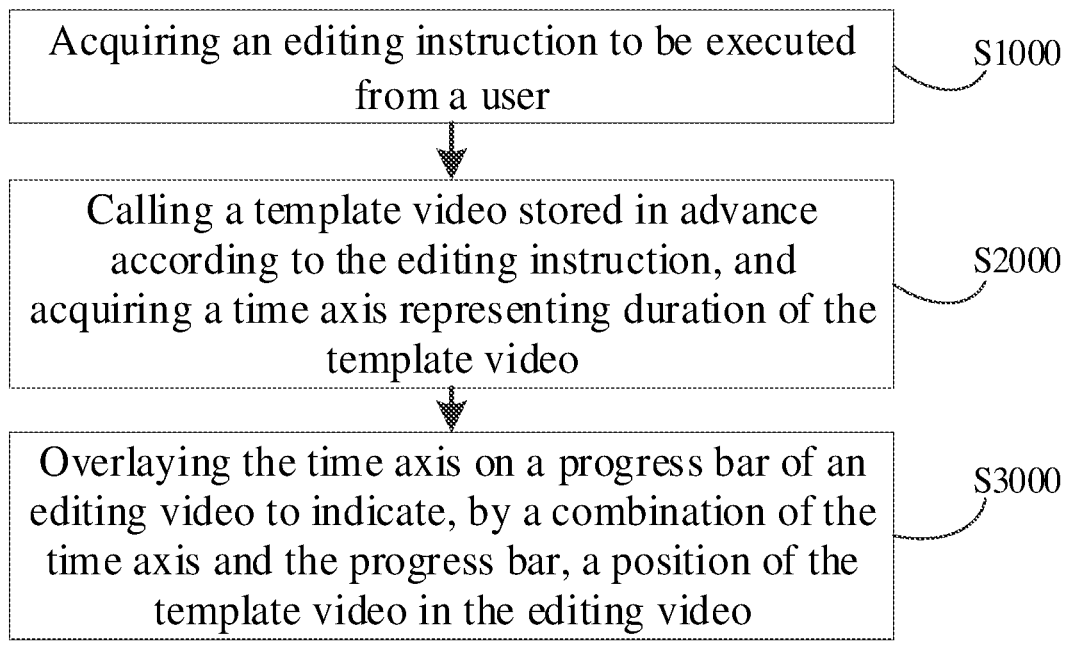
FIG. 1 is a schematic diagram of a basic steps of a video editing method according to an embodiment of the present disclosure.

In order to enable those skilled in the art to understand the solutions of the present disclosure in a better way, technical solutions of the embodiments of the present disclosure will be described clearly and completely below in combination with the accompanying drawings in embodiments of the present disclosure.

In some processes as described in the specification and claims of the present disclosure and the aforesaid drawings, a plurality of operations present in a specific sequence are described. However, it should be noted that these operations may be performed by a sequence different from the sequence present herein, or may be performed in parallel. The numbers of operations, such as 101 and 102, are only used to distinguish different operations, and the numbers per se do not represent any executing sequence. In addition, these processes may include more or fewer operations, and these operations may be performed in sequence or in parallel. It should be noted that expressions, such as, "first", "second" or the like as described herein, are used to distinguish different messages, devices, modules, etc., and do not represent any specific sequence, nor does it mean that the "first" and "second" items are of different types.

The technical solutions in the embodiments of the present disclosure will be clearly and completely described below with reference to the drawings in the embodiments of the present disclosure. Apparently, the embodiments as described are merely some, rather than all, of the embodiments of the present disclosure. Based on the embodiments in the present application, all the other embodiments obtained by a person of ordinary skills in the art without making creative efforts shall fall within the protection scope of the present disclosure.

Embodiment

In the related art, while editing multiple videos on the intelligent mobile terminal, a plurality of time tracks have to be presented in a display region, with each time track representing one video. By adjusting the positions of the various videos on their respective time tracks, the videos can be fitted together at different time points.

However, the display region of the intelligent terminal is relatively small and the editing instruction as received is issued by a user by using the finger to touch on the display region, as such, in the limited and narrow operating region, a method of editing multiple time-tracks will take up too much space and compress the display area of other functional regions. In addition, as the operation is performed by the finger, difficulties in controlling the editing would occur since the method of editing multiple tracks will inevitably cause the editing interface and editing button to be very small. This may also lead to the problems of low accuracy and increased probability of misoperation in editing.

In the embodiments of the present disclosure, when editing the video, by overlaying the time axis representing duration of the template video on the progress bar of the editing video, the position where the template video is added to the editing video can be visually determined by observing the relative position relation between the time axis and the progress bar, which can simplify the editing region and reduce the area occupied by the editing region. In addition, the user can adjust the position where the template video is added to the editing video by adjusting relative position of the time axis on the progress bar, as such, the editing region can be simplified to provide sufficient space for designing the time axis container, which therefore makes it convenient for the user to adjust the editing, thereby reducing the difficulty in controlling the editing and improving the accuracy of the editing and success rate of the operation.

Referring to FIG. 1, a schematic diagram of a basic structure of a video editing method according to an embodiment of the present disclosure is shown.

As shown in FIG. 1, the video editing method includes the following steps.

In step S1000, an editing instruction to be executed is acquired from a user.

When the user uses the intelligent mobile terminal to edit a captured or locally stored video, the user uses a finger or a touch pen to issue a clicking or sliding instruction. After receiving the clicking or sliding instruction from the user, the terminal enters a video editing state, and then acquires the editing instruction of the user.

In step S2000, a template video stored in advance is called according to the editing instruction, and a time axis representing duration of the template video is acquired.

After acquiring the editing instruction from the user, the intelligent mobile terminal calls a template video stored in a local memory and acquire the time axis representing the duration of the template video.

The template video is a short video with special effects subject to clipping, and duration of the template video is shorter than that of the editing video. The content of the editing video is not limited to a video with special effects. Depending on different application scenarios, the template video may be any video selected by the user for performing video synthesis.

In step S3000, the time axis is overlaid on a progress bar of an editing video to indicate, by a combination of the time axis and the progress bar, a position of the template video in the editing video.

The editing video is a video to be edited selected by the user, and the template video is a material for use in the editing of the editing video. In an editing state, the intelligent mobile terminal may display the progress bar of the editing video in the display region. Preferably, in the embodiments of the present disclosure, the progress bar is a frame progress bar, which is a time axis of the editing video composed of a number of thumbnails of frame images that are arranged according to timeline. The representation form of the progress bar is not limited to the frame progress bar. Depending on different application scenarios, the progress bar may be other forms of progress bars in the prior art.

The time axis is a visible bar-shaped frame that represents the duration of the template video. The length of the time axis frame can be stretched and contracted according to the environment where the time axis frame is located. That is, one time axis frame may have different lengths in different application environments. For example, when duration of a template video is 5 seconds and duration of an editing video is 20 seconds, then the time axis will occupy one quarter of the total length of the progress bar. When duration of a template video is 5 seconds and duration of an editing video is seconds, then the time axis on the progress bar will occupy one-ninth of the total length of the progress bar.

Before overlaying the time axis on the progress bar, the total duration of the editing video and the physical length of the progress bar of the edited video are acquired. After the duration represented by the time axis is acquired, the proportion of the duration of the time axis to the total duration of the progress bar can be calculated, and thereby the physical length of the time axis can be calculated according to the proportion and the physical length of the progress bar.

Figure 2:
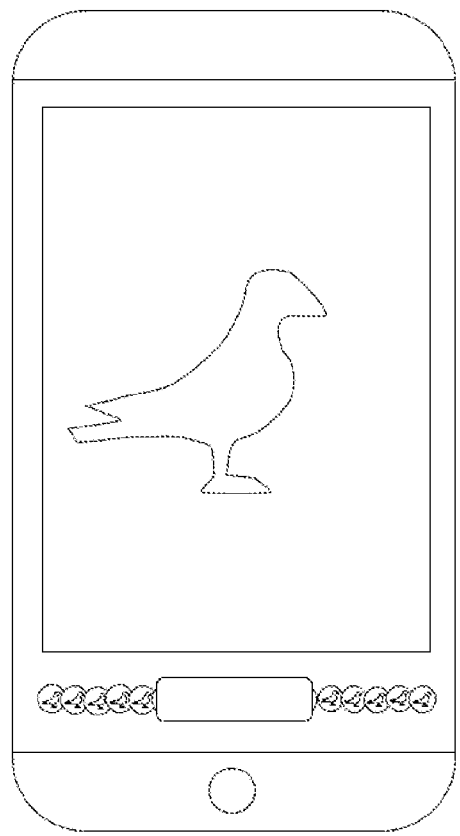
FIG. 2 is a first schematic diagram of a video editing state according to an embodiment of the present disclosure.

Referring to FIG. 2, a first schematic diagram of a video editing state according to an embodiment of the present disclosure is shown.

As shown in FIG. 2, in the video editing state, after the template video is called, the time axis which represents duration of the template video is overlaid on the progress bar which represents the duration of the editing video. The position of the time axis of the template video on the progress bar indicates the position where the template video is overlaid on the editing video. In this implementation, the width of the time axis frame is greater than the width of the progress bar, and the color of the time axis is different from the color of the progress bar. In some implementations, the time axis may also be constructed as translucent.

According to the aforesaid implementation, when editing the video, by overlaying the time axis representing duration of the template video on the progress bar of the editing video, the position where the template video is added to the editing video can be visually determined by observing the relative position relation between the time axis and the progress bar, which can simplify the editing region and reduce the area occupied by the editing region. In addition, the user can adjust the position where the template video is added to the editing video by adjusting relative position of the time axis on the progress bar, as such, the editing region can be simplified to provide sufficient space for designing the time axis container, which therefore makes it convenient for the user to adjust the editing, thereby reducing the difficulty in controlling the editing and improving the accuracy of the editing and success rate of the operation.

In some implementations, it is desired to add a plurality of template videos during the editing of the editing video. For details, reference can be made to FIG. 3, which is a schematic flowchart for adding a plurality of template videos according to an embodiment of the present disclosure.

Figure 3:
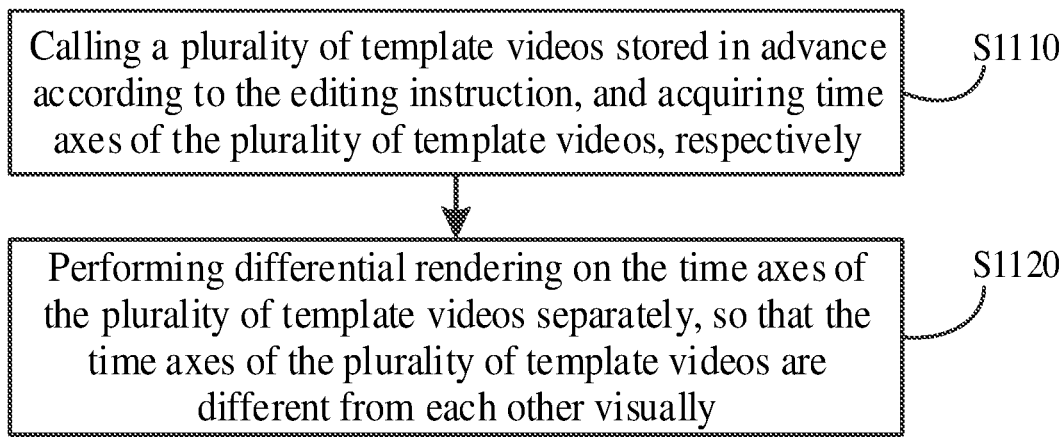
FIG. 3 is a schematic flowchart for adding a plurality of template videos according to an embodiment of the present disclosure.

As shown in FIG. 3, the following steps are included after step S1000.

In step S1110, a plurality of template videos stored in advance are called according to the editing instruction, and time axes of the plurality of template videos are acquired respectively.

In the editing state, editing instructions which are issued by the user for adding a plurality of template videos are acquired sequentially, and the plurality of template videos and corresponding time axes are called sequentially according to the editing instructions.

In step S1120, differential rendering is performed on the time axes of the plurality of template videos separately, so that the time axes of the plurality of template videos are different from each other visually.

Before executing step S2000, it is needed to render the plurality of time axes differentially. Specifically, differential rendering refers to specify color values to the time axes of the plurality of template videos separately, so that the time axes of the plurality of template videos are different from each other visually.

Specifically, before performing the rendering, each color value to be rendered may be acquired randomly, or the color values may be sequentially picked from a preset color value database.

Step S2000 is executed after the completion of the rendering of each time axis, and the above steps are repeated until all of the plurality of time axes have been overlaid on the progress bar.

In some implementations, it is needed to revoke a plurality of videos that have been added. For details, reference can be made to FIG. 4, which is a schematic flowchart for revoking a template video according to an embodiment of the present disclosure.

Figure 4:
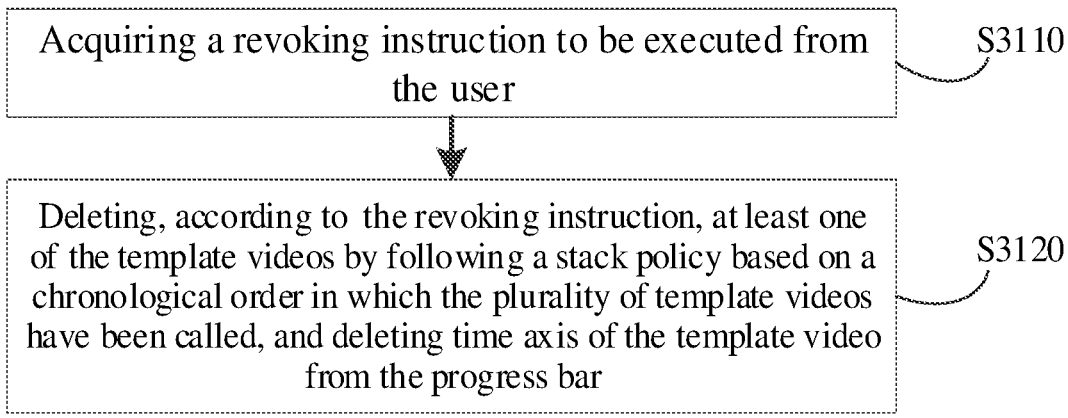
FIG. 4 is a schematic flowchart for revoking a template video according to an embodiment of the present disclosure.

As shown in FIG. 4, the following steps are included after step S3000.

In step S3110, a revoking instruction to be executed from the user is acquired.

In a previewing state, a revoking instruction from the user is acquired. The user may issue the revoking instruction by clicking the region around a specific position (a revoking button) in the display region of the intelligent mobile terminal.

In step S3120, according to the revoking instruction, at least one of the template videos is deleted by following a stack policy based on a chronological order in which the plurality of template videos have been called, and time axis of the deleted template video is deleted from the progress bar.

When storing the template videos to be added to the editing video, the mobile intelligent mobile terminal adopts a stacking policy which is characterized in the first-in last-out (FILO) mode. As a plurality of template videos will be provided on one editing video, and are added and stored in a staking mode, when the revoking step is performed, the template videos as stored temporarily can be deleted in a stacking mode as well. That is, the template video which enters the temporary storing space at last will be deleted first, and the template video which enters the temporary storing space first will be deleted at last; and the time axes of the deleted template video which have been overlaid on the progress bar are revoked.

According to the aforesaid implementation, the template videos can be added and deleted quickly, which makes it convenient for the user to operate.

In some implementations, the editing page may have various editing regions. When the position of the time axis is edited, to prevent an editing instruction issued by the user from triggering multiple editing operations, it is necessary to make sure that the editing is performed at a specified position. For details, reference can be made to FIG. 5, which is a schematic flowchart of a method for updating the position of a time axis according to an embodiment of the present disclosure.

Figure 5:
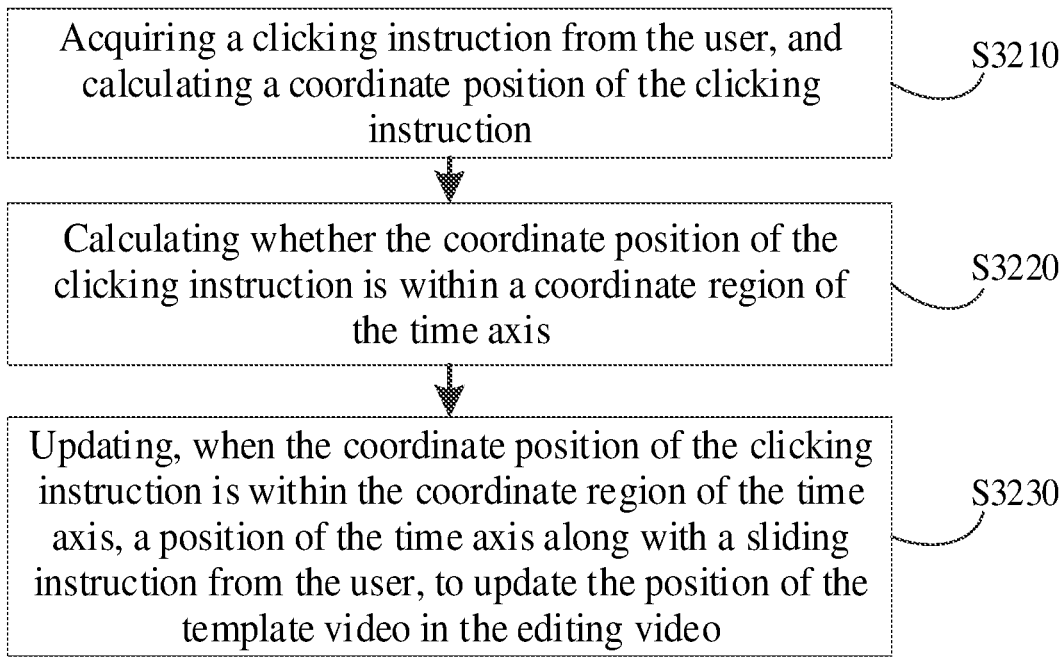
FIG. 5 is a schematic flowchart of a method for updating the position of a time axis according to an embodiment of the present disclosure.

As shown in FIG. 5, the following steps are included after step S3000.

In step S3210, a clicking instruction from the user is acquired, and a coordinate position of the clicking instruction is calculated.

In the editing state, the intelligent mobile terminal acquires the clicking instruction as issued and calculates the coordinate specified by the clicking instruction from the user.

In step S3220, whether the coordinate position of the clicking instruction is within a coordinate region of the time axis is calculated.

The coordinates of the time axis are a set of all the coordinates located in the time axis frame. After the coordinate of the clicking instruction from the user is acquired, it is determined whether the coordinate specified by the user is within the set of coordinates of the time axis by comparison. If not, it indicates that the user does not issue an adjusting instruction for changing the position of the time axis; while if yes, it indicates that the user has issued an instruction for adjusting the position of the time axis, and step S3230 will be further executed.

In step S3230, the position of the time axis is updated according to a sliding instruction of the user when the coordinate position of the clicking instruction is within the coordinate region of the time axis, so that the position of the template video in the editing video is updated.

When the coordinate of the clicking instruction is within the coordinate region of the time axis, it is determined that the user instructs to adjust the position of the time axis. In this case, the coordinate of the time axis moves along with the sliding track of the user, and the position where the user finger stays in the last is acquired after the user finishes the sliding instruction, the coordinate of the position as stayed in the last being the new coordinate position of the updated time axis.

Through the aforesaid implementation, the position of the time axis can be adjusted more intuitively by the user. In addition, by setting this confirmation procedure on the user instruction, the problem that the user cannot perform other editing activities while setting position of the time axis can be avoided. Moreover, since the position of the time axis can only be adjusted while clicking the coordinate region of the time axis, the user can perform other operations on the video when the coordinate region of the time axis is not clicked, which makes it convenient for the user to edit.

Figure 6:
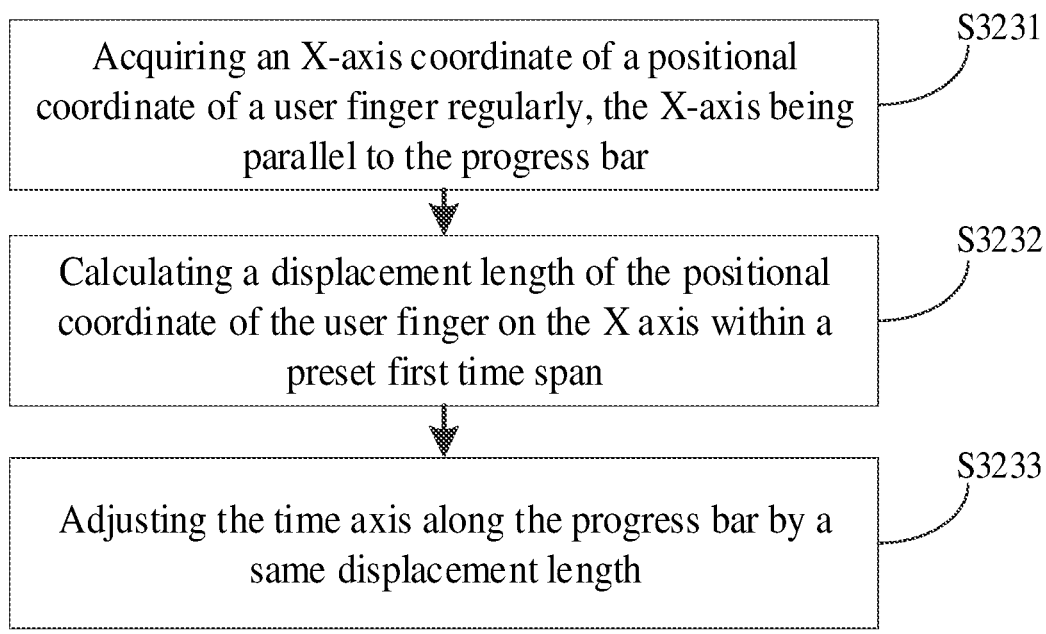
FIG. 6 is a schematic flowchart of a specific implementation for adjusting the position of a time axis according to an embodiment of the present disclosure.

Referring to FIG. 6, a schematic flowchart of a specific implementation for adjusting the position of a time axis according to an embodiment of the present disclosure is shown.

As shown in FIG. 6, step S3230 specifically includes the following steps.

In step S3231, an X-axis coordinate of a positional coordinate of a user finger is acquired regularly, the X-axis being parallel to the progress bar.

In this implementation, in the editing state, the progress bar extends along the width direction of the display region of the intelligent mobile terminal, namely along the X-axis direction of the two-dimensional coordinates.

The coordinate of the clicking or sliding instruction from the user acquired by the mobile terminal is also a two-dimensional coordinate. Thus, the moving direction and distance of the user finger within a preset time span can be calculated by regularly acquiring the changes in the coordinate of the user finger in the X-axis direction.

When regularly acquiring positional coordinate of the intelligent mobile terminal in a set time span, the preset time span may be, but not limited to, 0.1 second. In some implementations, the time span for the regularly acquiring step may be set according to specific requirement.

In step S3232, a displacement length of the positional coordinate of the user finger on an X axis within a preset first time span is calculated.

The displacement length of positional coordinate of the user finger on the X axis within a preset first time span (0.1 second) is calculated. For example, if the coordinate of the user finger moves from [100, 150] to [200, 170] within 0.1 second, that is, the user finger moves toward the positive X-direction (to the left) by a distance of 50 units within 0.1 second; and if the coordinate of the user finger moves from [100, 150] to [50, 170] within 0.1 second, that is, the user finger moves toward the negative X-axis direction (to the right) by a length of 50 units within 0.1 second.

In step S3233, the time axis is adjusted along the progress bar by a same displacement length.

After calculating the length of the displacement of the user along the X axis within the first time span, the time axis is moved along the same progress bar by the same displacement length, so as to update the position of the time axis on the progress bar.

Figure 7:
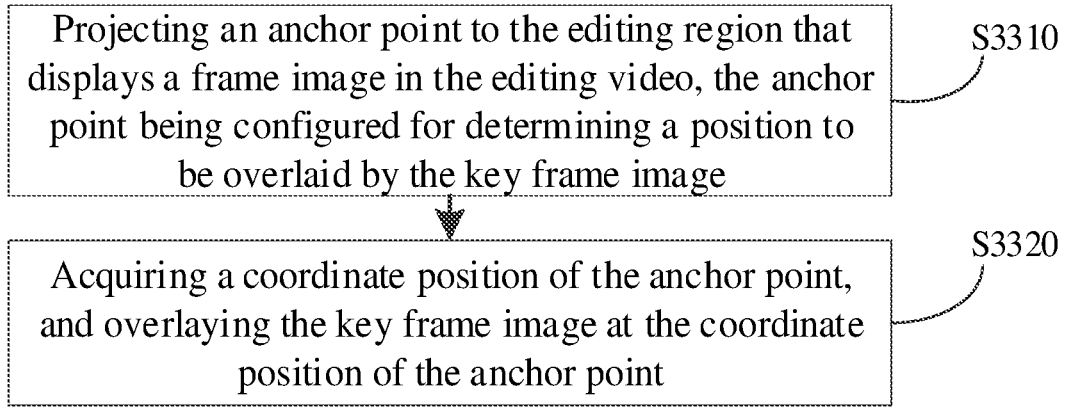
FIG. 7 is a schematic flowchart for determining the position overlaid by a key frame image according to an embodiment of the present disclosure.

In some implementations, an editing region is provided in a display region under a video editing state, and a key frame image is preset in the template video. The position of the key frame image on a corresponding frame image in the editing video needs to be determined during the editing. For details, reference can be made to FIG. 7 and FIG. 8, in which a schematic flowchart for determining a position overlaid by a key frame image according to an embodiment of the present disclosure is shown in FIG. 7, and a schematic diagram of a third display mode of a video editing state according to an embodiment of the present disclosure is shown in FIG. 8.

Figure 8:
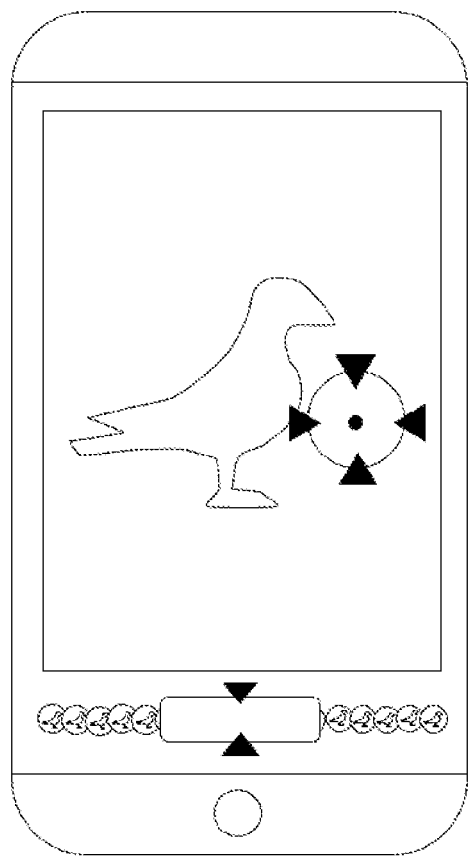
FIG. 8 is a schematic diagram of a third display mode of an editing state according to an embodiment of the present disclosure.

As shown in FIG. 8, the display region is provided with the editing region under the video editing state; a key frame image is preset in the template video; and an indicator icon is provided on the time axis for representing a specific position of the key frame image in the template video.

The editing region is located above the progress bar and is a frame scaled in a same proportion with the display area. The editing region displays a frame image representing the moment of the editing video when the progress bar terminates.

For the key frame image, the key frame image is selected in advance and is generally the frame image showing the plot with the most tension or the twisting plot in the template video (for example, a frame image showing a cannonball falling to the ground and exploding, when the template video relates to shelling, a frame image showing the instant that the meteorite impacts when the template video relates to meteorite impact, or a frame image showing the caption being arranged in a straight line when the template video relates to multi-character flight caption). However, the key frame image is not limited to this. Depending on different application scenarios, the key frame image may be a picture of an arbitrarily specified frame in the template video.

As shown in FIG. 7, the following steps may be further included after step S3000.

In step S3310, an anchor point is projected to the editing region where a frame image in the editing video is displayed, the anchor point being configured for determining a position to be overlaid by the key frame image.

In the video editing state, the anchor point is generated in the picture displayed in the editing region, the anchor point being configured for determining a positional coordinate, to be overlaid by the key frame image, in the frame image of the display region. In particular, the anchor point may be designed as a sniping anchor point, namely, an anchor point with an outer circle representing the range of the anchor point and an original point designed at the exact center. However, the form of the anchor point is not limited to this. Depending on different application scenarios, the anchor points may be designed into different patterns, such as, but not limited to, circles, rings, triangles or other polygons. Otherwise, the anchor point may also be replaced by cartoon patterns or other silhouette patterns, depending on different application scenarios.

In step S3320, coordinate position of the anchor point is acquired, and the key frame image is overlaid at the coordinate position of the anchor point.

The mobile intelligent terminal acquires the central coordinate position of the anchor point and sets the central coordinate position of the anchor point as the coordinate of the position, which is to be overlaid, in the frame image of the display region. When the video is synthesized after the video editing finishes, the key frame image is overlaid at the coordinate position where the anchor point is located in the frame image displayed in the display region during the editing.

In some implementations, the user may adjust the coordinate position of the anchor point through an instruction information, to control and adjust the position of the key frame image.

Through the mode of setting the coordinate of the anchor point, the user can freely determine the image position of the template video in the editing video. This mode enables the user to freely control the image position of the template video in the synthesized video, thereby improving the degree of freedom of the user in the video editing process.

In order to solve the aforesaid technical problems, an embodiment of the present disclosure further provides a video editing apparatus. For details, reference can be made to FIG. 9, which is a block diagram of a basic structure of a video editing apparatus according to an embodiment of the present disclosure.

Figure 9:
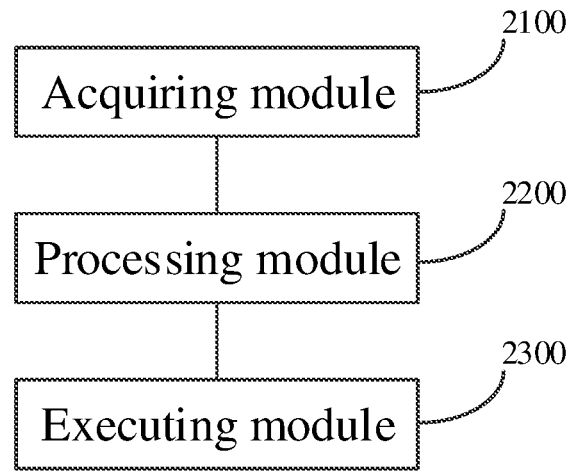
FIG. 9 is a block diagram of a basic structure of a video editing apparatus according to an embodiment of the present disclosure.

As shown in FIG. 9, the video editing apparatus includes an acquiring module 2100, a processing module 2200, and an executing module 2300. The acquiring module 2100 is configured to acquire an editing instruction to be executed from a user. The processing module 2200 is configured to call a template video stored in advance according to the editing instruction, and acquire a time axis representing duration of the template video. The executing module 2300 is configured to overlay the time axis on a progress bar of an editing video to indicate, by a combination of the time axis and the progress bar, a position of the template video in the editing video.

When the video editing apparatus edits the video, by overlaying the time axis representing duration of the template video on the progress bar of the editing video, the position where the template video is added to the editing video can be visually determined by observing the relative position relation between the time axis and the progress bar, which can simplify the editing region and reduce the area occupied by the editing region. In addition, the user can adjust the position where the template video is added to the editing video by adjusting relative position of the time axis on the progress bar, as such, the editing region can be simplified to provide sufficient space for designing the time axis container, which therefore makes it convenient for the user to adjust the editing, thereby reducing the difficulty in controlling the editing and improving the accuracy of the editing and success rate of the operation.

In some implementations, the video editing apparatus further includes a first calling sub-module and a first rendering sub-module. The first calling sub-module is configured to call a plurality of template videos stored in advance according to the editing instruction, and acquire time axes of the plurality of template videos, respectively. The first rendering sub-module is configured to perform differential rendering on the time axes of the plurality of template videos separately, so that the time axes of the plurality of template videos are different from each other visually.

In some implementations, the video editing apparatus further includes a first acquiring sub-module and a first revocation sub-module. The first acquiring sub-module is configured to acquire a revoking instruction to be executed from the user. The first revocation sub-module is configured to delete, according to the revoking instruction, at least one of the template videos by following a stack policy based on a chronological order in which the plurality of template videos have been called, and delete time axis of the deleted template video from the progress bar.

In some implementations, the video editing apparatus further includes a second acquiring sub-module, a first calculating sub-module, and a first adjusting sub-module. The second acquiring sub-module is configured to acquire a clicking instruction from the user, and calculate a coordinate position of the clicking instruction. The first calculating sub-module is configured to calculate whether the coordinate position of the clicking instruction is within a coordinate region of the time axis. The first adjusting sub-module is configured to update, when the coordinate position of the clicking instruction is within the coordinate region of the time axis, a position of the time axis according to a sliding instruction from the user, to update the position of the template video in the editing video.

In some implementations, the video editing apparatus further includes a third acquiring sub-module, a second calculating sub-module, and a second adjusting sub-module. The third acquiring sub-module is configured to acquire an X-axis coordinate of a positional coordinate of a user finger regularly, the X-axis being parallel to the progress bar. The second calculating sub-module is configured to calculate a displacement length of the positional coordinate of the user finger on the X axis within a preset first time span. The second adjusting sub-module is configured to adjust the time axis along the progress bar by a same displacement length.

In some implementations, an editing region is provided in a display region under a video editing state, and a key frame image is preset in the template video. The video editing apparatus further includes a first generating sub-module and a first processing sub-module. The first generating sub-module is configured to project an anchor point to the editing region that displays frame images in the editing video, the anchor point being configured for determining a position to be overlaid by the key frame image. The first processing sub-module is configured to acquire a coordinate position of the anchor point, and overlay the key frame image at the coordinate position of the anchor point.

In some implementations, the time axis is provided with an indicator icon for representing a specific position of the key frame image in the template video.

In some implementations, the differential rendering specifically refers to separately setting color values for the time axes of the plurality of template videos, so that time axes of the plurality of template videos are different from each other visually.

An embodiment further provides an intelligent mobile terminal. For details, reference can be made to FIG. 10, which is a schematic diagram of a basic structure of an intelligent mobile terminal according to an embodiment of the present disclosure.

It should be noted that, in this embodiment, all programs configured to implement the video editing method in this embodiment are stored in a memory 1520 of the intelligent mobile terminal, and a processor 1580 can call the programs in the memory 1520 and execute all functions listed in the aforesaid video editing method. Since functions that may be implemented by the intelligent mobile terminal have been described in detail in the video editing method in the embodiments of the present disclosure, thus are not described here for the purpose of conciseness.

When the intelligent mobile terminal edits the video, by overlaying the time axis representing duration of the template video on the progress bar of the editing video, the position where the template video is added to the editing video can be visually determined by observing the relative position relation between the time axis and the progress bar, which can simplify the editing region and reduce the area occupied by the editing region. In addition, the user can adjust the position where the template video is added to the editing video by adjusting relative position of the time axis on the progress bar, as such, the editing region can be simplified to provide sufficient space for designing the time axis container, which therefore makes it convenient for the user to adjust the editing, thereby reducing the difficulty in controlling the editing and improving the accuracy of the editing and success rate of the operation.

Figure 10:
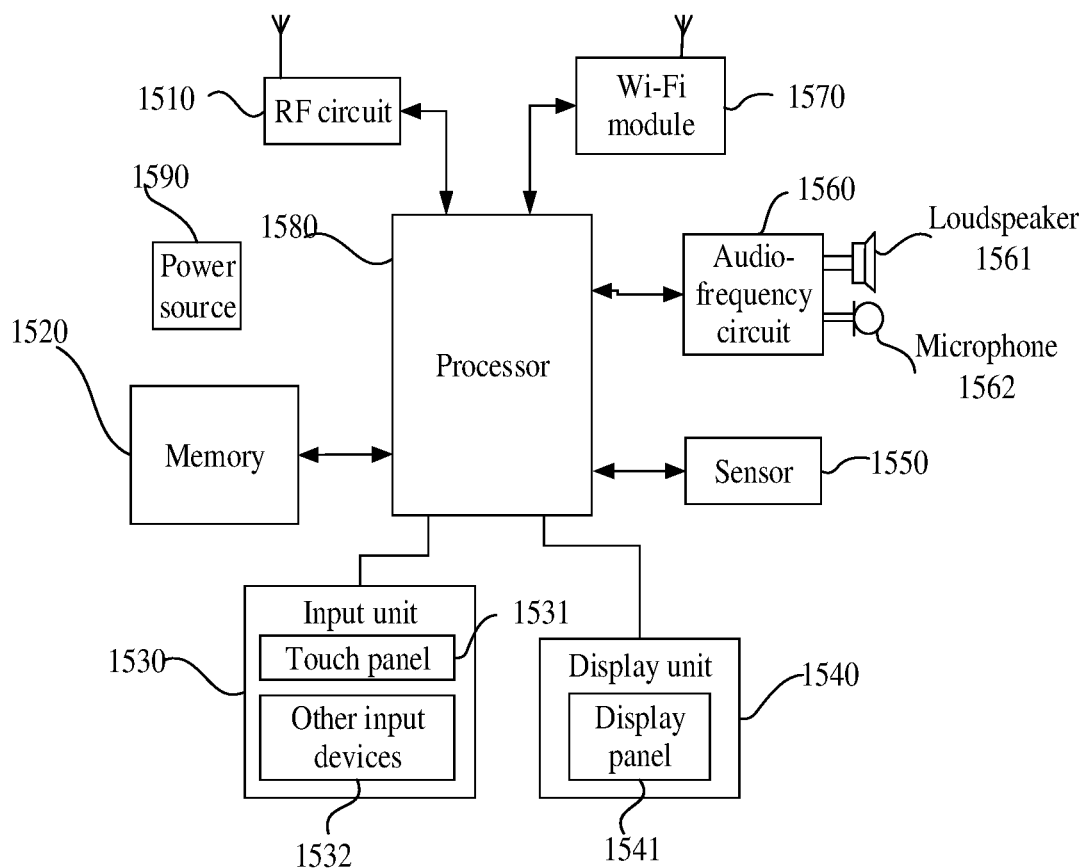
FIG. 10 is a block diagram of a basic structure of an intelligent mobile terminal according to an embodiment of the present disclosure.

An embodiment of the present disclosure also provides an intelligent mobile terminal. As shown in FIG. 10, for the convenience of description, only the parts related to the embodiments of the present disclosure are shown. For the specific technical details not disclosed, reference can be made to the method part of the embodiment of the present disclosure. The terminal may be any terminal device including an intelligent mobile terminal, a tablet computer, a Personal Digital Assistant (PDA), a Point of Sales (POS), an onboard computer. The terminal being an intelligent mobile terminal is taken as an example.

FIG. 10 is a block diagram showing a partial structure of an intelligent mobile terminal related to the terminal provided by an embodiment of the present disclosure. Referring to FIG. 10, the intelligent mobile terminal includes: a radio frequency (RF) circuit 1510, a memory 1520, an input unit 1530, a display unit 1540, a sensor 1550, an audio circuit 1560, a wireless fidelity (Wi-Fi) module 1570, a processor 1580, a power supply 1590 and other components. It will be understood by those skilled in the art that the structure of the intelligent mobile terminal shown in FIG. 10 does not constitute a limitation to the intelligent mobile terminal, and may include more or less components than those illustrated, or a combination of some components, or different component arrangements.

The respective components of the intelligent mobile terminal is described in detail as follows by combining FIG. 10.

The RF circuit 1510 may be used for receiving and transmitting signals during the transmission or reception of information or during a call. Specifically, after receiving downlink information from a base station, the downlink information is processed by the processor 1580. In addition, data designed for the uplink is sent to the base station. Generally, the RF circuit 1510 includes, but is not limited to, an antenna, at least one amplifier, a transceiver, a coupler, a Low Noise Amplifier (LNA), a duplexer, and the like. In addition, the RF circuitry 1510 may also communicate with the network and other devices via wireless communication. The above wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS), and the like.

The memory 1520 may be used to store software programs and modules. The processor 1580 executes various functional applications and data processing of the intelligent mobile terminal by running the software programs and modules stored in the memory 1520. The memory 1520 may mainly include a program storage area and a data storage area. The program storage area may store an operating system, an application required for at least one function (such as a voiceprint playing function, an image playing function, etc.), and the like. The data storage area may store data (such as audio data, a directory, etc.) created according to the usage of the intelligent mobile terminal. Moreover, the memory 1520 may include a high-speed random-access memory, and may also include a non-volatile memory, such as at least one magnetic disk memory device, flash memory device, or other volatile solid-state memory device.

The input unit 1530 may be configured to receive input numeric or character information and to generate key signal inputs related to user settings and function controls of the intelligent mobile terminal. Specifically, the input unit 1530 may include a touch panel 1531 and other input device 1532. The touch panel 1531, also referred to as a touch screen, may collect touch operations of the user on or near the touch panel (for example, the user may use any proper article or accessory, such as a finger, a stylus, or the like, to operate on the touch panel 1531 or near the touch panel 1531), and drive a corresponding connecting device according to a preset program. Optionally, the touch panel 1531 may include two parts: a touch detection device and a touch controller. The touch detection device detects the touch orientation of the user, detects a signal generated by the touch operation, and transmits the signal to the touch controller. The touch controller receives the touch information from the touch detection device, converts the touch information into contact coordinates, and sends same to the processor 1580, and may receive commands from the processor 1580 and execute them. In addition, the touch panel 1531 may be implemented as various types such as resistive type, capacitive type, infrared type, and surface acoustic wave type. In addition to the touch panel 1531, the input unit 1530 may also include other input device 1532. Specifically, other input device 1532 may include, but are not limited to, one or more of a physical keyboard, a function key (such as a volume control button, a switch button, etc.), a trackball, a mouse, a joystick, and the like.

The display unit 1540 may be used to display information input by the user or information provided to the user as well as various menus of the intelligent mobile terminal. The display unit 1540 may include a display panel 1541. Optionally, the display panel 1541 may be configured in the form of a liquid crystal display (LCD), an organic light-emitting diode (OLED), or the like. Further, the touch panel 1531 may be overlaid on the display panel 1541. After the touch panel 1531 detects a touch operation on or near the touch panel, the touch panel 1531 transmits same to the processor 1580 to determine the type of the touch event. Then the processor 1580, according to the type of the touch event, provides a corresponding visual output on the display panel 1541. Although in FIG. 10, the touch panel 1531 and the display panel 1541 are used as two independent components to implement the input and output functions of the intelligent mobile terminal, in some embodiments, the touch panel 1531 and the display panel 1541 may be integrated to realize the input and output functions of the intelligent mobile terminal.

The intelligent mobile terminal may also include at least one type of sensor 1550, such as a light sensor, a motion sensor, and other sensors. Specifically, the light sensor may include an ambient light sensor and a proximity sensor. The ambient light sensor may adjust the brightness of the display panel 1541 according to the brightness of the ambient light. The proximity sensor may close the display panel 1541 and/or the backlight when the intelligent mobile terminal moves to the ear. As a kind of motion sensor, an accelerometer sensor may detect the acceleration of each direction (usually three axes), may detect the magnitude and direction of gravity at rest, and may be used for an application that identifies the gesture of the intelligent mobile terminal (such as horizontal and vertical screen switching, related game, magnetometer attitude calibration) and vibration recognition related functions (such as pedometer, tapping), etc. Other sensors such as gyroscopes, barometers, hygrometers, thermometers, infrared sensors, etc. that may be equipped on intelligent mobile terminals will not be described here.

An audio circuit 1560, a speaker 1561, and a microphone 1562 may be used to provide an audio interface between the user and the intelligent mobile terminal. The audio circuit 1560 may transmit the electrical signal converted from the received audio data to the speaker 1561, and the speaker 1561 converts it into a voiceprint signal output. On the other hand, the microphone 1562 converts the collected voiceprint signal into an electrical signal which is received by the audio circuit 1560 to be converted to audio data, and the audio data is output to the processor 1580 for processing and being transmitted to another intelligent mobile terminal via the RF circuit 1510, or the audio data is output to the memory 1520 for further processing.

Wi-Fi is a short-range wireless transmission technology. The intelligent mobile terminal may help users to send and receive e-mail, browse web pages and access streaming media through the Wi-Fi module 1570. It provides users with wireless broadband Internet access. Although FIG. 10 shows the Wi-Fi module 1570, it may be understood that it does not belong to the essential configuration of the intelligent mobile terminal, and may be omitted as needed within a scope in which the essence of the present disclosure is not changed.

The processor 1580 is the control center of the intelligent mobile terminal that may connect various portions of the entire intelligent mobile terminal by using various interfaces and lines, and may execute various functions and processing data of the intelligent mobile terminal by running or executing the software programs and/or modules stored in the memory 1520 and calling data stored in the memory 1520, so as to realize overall monitoring of the intelligent mobile terminal. Optionally, the processor 1580 may include one or more processing units. Preferably, the processor 1580 may integrate an application processor and a modem processor. The application processor mainly processes an operating system, a user interface, an application, and the like. The modem processor primarily handles wireless communications. It will be appreciated that the above described modem processor may also be not integrated into the processor 1580.

The intelligent mobile terminal also includes a power supply 1590 (such as a battery) that supplies power to the various components. Preferably, the power supply may be logically connected to the processor 1580 via a power management system to manage functions such as charging, discharging, and power consumption management through the power management system.

Although not shown, the intelligent mobile terminal may further include a camera, a Bluetooth module, and the like, and details thereof are not described herein for the purpose of conciseness.

In some embodiments, a video editing method is provided. The method includes the following steps:
acquiring an editing instruction to be executed from a user;
calling a template video stored in advance according to the editing instruction, and acquiring a time axis representing duration of the template video; and
overlaying the time axis on a progress bar of an editing video to indicate, by a combination of the time axis and the progress bar, a position of the template video in the editing video.

In some embodiments, after acquiring the editing instruction to be executed from the user, the method further includes:
calling a plurality of template videos stored in advance according to the editing instruction, and acquiring time axes of the plurality of template videos, respectively; and
performing differential rendering on the time axes of the plurality of template videos separately, so that the time axes of the plurality of template videos are different from each other visually.

In some embodiments, after overlaying the time axis on the progress bar of the editing video to indicate the position of the template video in the editing video by the combination of the time axis and the progress bar, the method further includes:
acquiring a revoking instruction to be executed from the user; and
deleting, according to the revoking instruction, at least one of the template videos by following a stack policy based on a chronological order in which the plurality of template videos have been called, and deleting time axis of the template video from the progress bar.

In some embodiments, after overlaying the time axis on the progress bar of the editing video to indicate the position of the template video in the editing video by the combination of the time axis and the progress bar, the method further includes:
acquiring a clicking instruction from the user, and calculating a coordinate position of the clicking instruction;
calculating whether the coordinate position of the clicking instruction is within a coordinate region of the time axis; and
updating, when the coordinate position of the clicking instruction is within the coordinate region of the time axis, a position of the time axis along with a sliding instruction from the user, to update the position of the template video in the editing video.

In some embodiments, the updating, when the coordinate position of the clicking instruction is within the coordinate region of the time axis, the position of the time axis along with the sliding instruction from the user, to update the position of the template video in the editing video specifically includes:
acquiring an X-axis coordinate of a positional coordinate of a user finger regularly, the X-axis being parallel to the progress bar;
calculating a displacement length of the positional coordinate of the user finger on the X axis within a preset first time span; and
adjusting the time axis along the progress bar by a same displacement length.

In some embodiments, an editing region is provided in a display region under a video editing state, and a key frame image is preset in the template video; and
after overlaying the time axis on the progress bar of the editing video to indicate the position of the template video in the editing video by the combination of the time axis and the progress bar, the method further includes:
projecting an anchor point to the editing region that displays a frame image in the editing video, wherein the anchor point is configured for determining a position to be overlaid by the key frame image; and
acquiring a coordinate position of the anchor point, and overlaying the key frame image at the coordinate position of the anchor point.

In some embodiments, the time axis is provided with an indicator icon for representing a specific position of the key frame image in the template video.

In some embodiments, the differential rendering is specifically setting color values for the time axes of the plurality of template videos separately, so that the time axes of the plurality of template videos are different from each other visually.

In some embodiments, an intelligent mobile terminal is provided. The terminal includes:
one or more processors;
a memory; and
one or more application programs, wherein the one or more application programs are stored in the memory and are configured to be executed by the one or more processors, and the one or more application programs are configured to perform the method in the aforementioned embodiments.

It should be noted that the description and the accompanying drawings of the present disclosure present some preferred embodiments of the present disclosure, however, the present disclosure can be implemented in many different forms, which are not limited to the embodiments set forth herein. These embodiments are not to be construed as additional limitations to the content of the present disclosure, and the purpose of providing these embodiments is to enable the present disclosure to be understood more thoroughly and comprehensively. In addition, the aforesaid technical features may be further combined with each other to form various embodiments which are not listed above, and all of them are to be regarded as the scope described in the description of the present disclosure. Further, modifications and variations may be made by those skilled in the art according to the aforesaid specification, and all such modifications and variations shall fall within the protection scope of the appended claims.

The invention claimed is:

1. A video editing method, comprising:
   displaying a progress bar of an editing video in a video editing state, wherein the progress bar is a frame progress bar composed of a number of thumbnails of frame images that are arranged according to timeline, the editing video is a captured or locally stored video to be edited, and the template video is a video for editing the editing video;
   calling a plurality of template videos in response to an editing instruction for the editing video, and acquiring time axes of the plurality of template videos respectively, and performing differential rendering on the time axes of the plurality of template videos separately, so that the time axes of the plurality of template videos are different from each other visually, wherein the time axis is a visible bar-shaped frame representing duration of the template video, and a physical length of the time axis is determined according to a proportion of the duration of the template video to duration of the editing video and a physical length of the progress bar of the editing video; and
   overlaying the time axes of the plurality of template videos on the progress bar of the editing video to indicate, by a combination of the time axes of the plurality of template videos and the progress bar, positions where the plurality of template videos are added to the editing video.

2. The video editing method according to claim 1, wherein after overlaying the time axis on the progress bar of the editing video to indicate the position of the template video in the editing video by the combination of the time axis and the progress bar, the method further comprises:
   acquiring a revoking instruction; and
   deleting, according to the revoking instruction, at least one of the template videos by following a stack policy based on a chronological order in which the plurality of template videos have been called, and deleting time axis of the deleted template video from the progress bar.

3. The video editing method according to claim 1, wherein after overlaying the time axis on the progress bar of the editing video to indicate the position of the template video in the editing video by the combination of the time axis and the progress bar, the method further comprises:
   acquiring a clicking instruction, and calculating a coordinate of a clicking position corresponding to the clicking instruction;
   determining whether the coordinate of the clicking position is within a coordinate region of the time axis; and
   updating, in response to the coordinate of the clicking position of the clicking instruction being within the coordinate region of the time axis, a position of the time axis according to a sliding instruction as acquired, to update the position of the template video in the editing video.

4. The video editing method according to claim 3, wherein the updating, in response to that the coordinate of the clicking position of the clicking instruction is within the coordinate region of the time axis, a position of the time axis according to a sliding instruction as acquired, to update the position of the template video in the editing video, comprises:
   acquiring an X-axis coordinate from a coordinate of a touch position regularly, the X-axis being parallel to the progress bar;
   calculating a displacement length of the coordinate of the touch position on the X axis within a preset first time span; and
   adjusting the time axis along the progress bar by a same displacement length.

5. The video editing method according to claim 1, wherein an editing region is provided in a display region under a video editing state, and a key frame image is preset in the template video; and
   after overlaying the time axis on the progress bar of the editing video to indicate the position of the template video in the editing video by the combination of the time axis and the progress bar, the method further comprises:
   projecting an anchor point to the editing region that displays a frame image in the editing video, the anchor point being configured for determining a position to be overlaid by the key frame image; and
   acquiring a coordinate position of the anchor point, and overlaying the key frame image at the coordinate position of the anchor point.

6. The video editing method according to claim 5, wherein the time axis is provided with an indicator icon for representing a specific position of the key frame image in the template video.

7. The video editing method according to claim 1, wherein the differential rendering comprises setting color values for the time axes of the plurality of template videos separately, so that the time axes of the plurality of template videos are different from each other visually.

8. An intelligent mobile terminal, comprising:
   one or more processors;
   a memory; and
   one or more application programs, wherein the one or more application programs are stored in the memory and are configured to be executed by the one or more processors, and the one or more application programs are configured to:
   display a progress bar of an editing video in a video editing state, wherein the progress bar is a frame progress bar composed of a number of thumbnails of frame images that are arranged according to timeline, the editing video is a captured or locally stored video to be edited, and the template video is a video for editing the editing video;
   call a plurality of template videos in response to an editing instruction for the editing video, and acquire time axes of the plurality of template videos respectively, and performing differential rendering on the time axes of the plurality of template videos separately, so that the time axes of the plurality of template videos are different from each other visually, wherein the time axis is a visible bar-shaped frame representing duration of the template video, and a physical length of the time axis is determined according to a proportion of the duration of the template video to duration of the editing video and a physical length of the progress bar of the editing video; and
   overlay the time axes of the plurality of template videos on the progress bar of the editing video to indicate, by a combination of the time axes of the plurality of template videos and the progress bar, positions where the plurality of template videos are added to the editing video.

9. The intelligent mobile terminal according to claim 8, wherein after overlaying the time axis on the progress bar of the editing video to indicate the position of the template video in the editing video by the combination of the time axis and the progress bar, the one or more application programs are further configured to:

acquire a revoking instruction; and delete, according to the revoking instruction, at least one of the template videos by following a stack policy based on a chronological order in which the plurality of template videos have been called, and delete time axis of the deleted template video from the progress bar.

10. The intelligent mobile terminal according to claim 8, wherein after overlaying the time axis on the progress bar of the editing video to indicate the position of the template video in the editing video by the combination of the time axis and the progress bar, the one or more application programs are further configured to:

acquire a clicking instruction, and calculating a coordinate of a clicking position corresponding to the clicking instruction;

determine whether the coordinate of the clicking position is within a coordinate region of the time axis; and update, in response to the coordinate of the clicking position of the clicking instruction being within the coordinate region of the time axis, a position of the time axis according to a sliding instruction as acquired, to update the position of the template video in the editing video.

11. The intelligent mobile terminal according to claim 10, wherein the updating, in response to that the coordinate of the clicking position of the clicking instruction is within the coordinate region of the time axis, a position of the time axis according to a sliding instruction as acquired, to update the position of the template video in the editing video, comprises:

acquiring an X-axis coordinate from a coordinate of a touch position regularly, the X-axis being parallel to the progress bar;

calculating a displacement length of the coordinate of the touch position on the X axis within a preset first time span; and adjusting the time axis along the progress bar by a same displacement length.

12. The intelligent mobile terminal according to claim 8, wherein an editing region is provided in a display region under a video editing state, and a key frame picture is preset in the template video; and after overlaying the time axis on the progress bar of the editing video to indicate the position of the template video in the editing video by the combination of the time axis and the progress bar, the one or more application programs are further configured to:

project an anchor point to the editing region that displays a frame image in the editing video, the anchor point being configured for determining a position to be overlaid by the key frame image; and acquire a coordinate position of the anchor point, and overlay the key frame image at the coordinate position of the anchor point.

13. The intelligent mobile terminal according to claim 12, wherein the time axis is provided with an indicator icon for representing a specific position of the key frame image in the template video.

14. The intelligent mobile terminal according to claim 8, wherein the differential rendering comprises setting color values for the time axes of the plurality of template videos separately, so that the time axes of the plurality of template videos are different from each other visually.

* * * * *